United States Patent [19]
Price

[11] 3,747,283
[45] July 24, 1973

[54] MECHANISM FOR PRECISION LOCATING OF A CRANKSHAFT IN AN AUTOMATIC CRANKPIN GRINDING MACHINE

[75] Inventor: Ralph E. Price, Waynesboro, Pa.
[73] Assignee: Landis Tool Company, Waynesboro, Pa.
[22] Filed: Feb. 22, 1972
[21] Appl. No.: 227,766

[52] U.S. Cl............................ 51/237 CS, 51/105 SP
[51] Int. Cl............................................ B25b 41/06
[58] Field of Search................... 51/237 CS, 237 R, 51/105 SP, 105 EL, 216 ND; 82/40, 40.1

[56] References Cited
UNITED STATES PATENTS
2,813,385  11/1957  Mouer............................. 51/237 R
3,537,215  11/1970  Metz et al....................... 51/237 CS
3,583,108  6/1971   Oishi.............................. 51/237 CS Primary Examiner—Harold D. Whitehead
Assistant Examiner—Nicholas P. Godici
Attorney—Joseph R. Spalla

[57] ABSTRACT

Apparatus for effecting the precise rotary location of a workpiece, such as a crankshaft W, in an automatic machine tool, such as a crankpin grinding machine (10), wherein the locating function is dependent upon a hole (14) or similar recess in a flange (13) of the crankshaft W. The apparatus includes a locating pin (18) mounted on an index plate (16). The pin (18) has an axial slot in which is mounted a pivotable locating pin driver (28). The pin driver (28) is biased by a tension spring (31) radially outwardly from the slot. Axial movement of the workpiece W brings the hole (14) and the pin (18) into engagement; the pin (18) and the pin driver (28) engage opposite surfaces of the hole (14) and apply a turning force to the workpiece to correct for any misalignment between the pin (18) and the hole (14). During the operation of the grinding machine, the pin (18) and the pin driver (28) act to maintain the angular alignment of the crankshaft W with the spindle (11).

9 Claims, 4 Drawing Figures

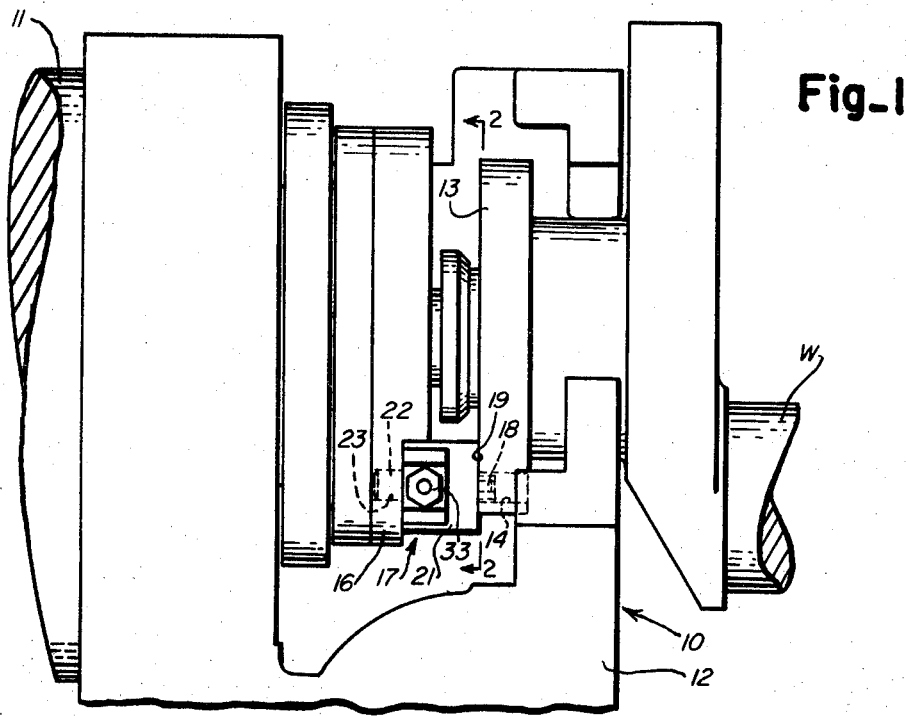
Fig._1
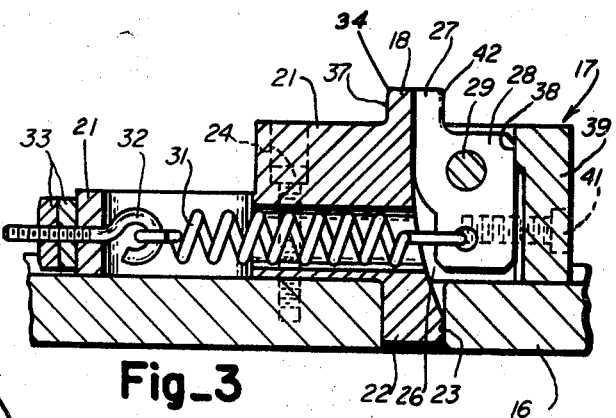
Fig._3
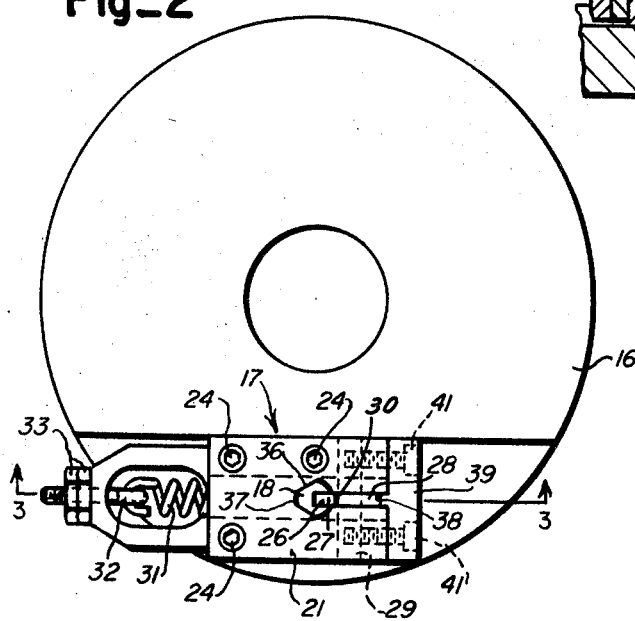
Fig._2
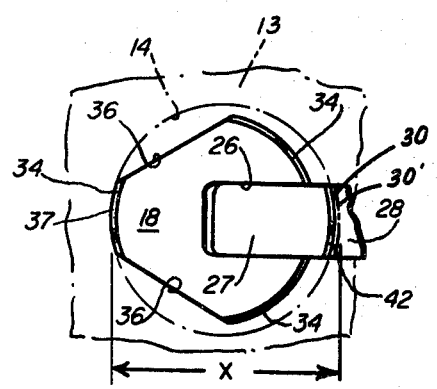
Fig._4
3,747,283

MECHANISM FOR PRECISION LOCATING OF A CRANKSHAFT IN AN AUTOMATIC CRANKPIN GRINDING MACHINE

BACKGROUND OF THE INVENTION

1. Field of the Invention

During the grinding of crankpins on automatic crankpin grinding machines, it is necessary that each crankpin be accurately positioned in precise alignment with the work drive spindle. This invention relates to new and useful improvements in a locating mechanism for effecting the precise rotary location of a crankshaft in an automatic crankpin grinding machine when the crankpin includes a flange having a locating hole or recess. The locating mechanism includes a pin which precisely angularly aligns the spindle of the machine and the crankshaft initially, and then maintains the alignment during the entire grinding cycle.

2. Description of the Prior Art

Prior to this invention, the angular positioning of a crankpin into precise axial alignment with the work drive spindle was accomplished by a conventional automatic rotary indexing mechanism that provided a reasonably accurate rotary index from one crankpin to another. However, it did not necessarily provide firm contact between the rotary locating means and the work locating surface of the crankshaft. This was obtained by applying a turning force directly to the crankpins by a preliminary advance movement of a work rest shoe or by yielding means for applying a locating force against the crankpin. Such devices are effective to perform rotary indexing functions, but they are expensive, complex, and the precision thereof is not completely satisfactory.

In a prior U.S. Pat. No. 3,583,109, granted June 8, 1971, precise rotary location of a crankshaft is obtained by a slight rotary movement of the crankshaft, which is actuated by a torsion spring to align the crankpin axis relative to the spindle axis. Firm engagement is effected by the movement between the locating surface of a locating pin and the surface of the locating hole in the crankshaft flange. This approach is satisfactory for small crankshafts of average weight; however, an additional hole is required in the flange of the crankshaft for receiving one end of the torsion spring. Also, the resilience or modulus of elasticity of a torsion spring may vary after repeated usage, and adjustment is difficult.

In another prior art patent, U.S. Pat. No. 3,537,215, granted Nov. 3, 1970, precise rotary location of a crankshaft is obtained by a locating mechanism which included a locating pin extending axially from the index plate in a position to enter a locating hole in the flange of a crankshaft. The locating pin included spaced rigid ball-like bearings which formed the terminal or distal sides of the pin, and an off-center gap was provided in the locating pin to allow one portion to flex slightly so that both sides of the hole were contacted by the terminal sides of the pin.

Another embodiment of that patent describes a one-piece rigid pin, which provides a housing for a ball which is forced outwardly by a compression spring carried within a transverse bore in the pin. Each of the above arrangements provides a shifting movement and/or a turning force against the flange of the crankshaft to provide rotary location. The above arrangements are satisfactory, but they are difficult to manufacture and they may require the care of an operator to insure proper operation.

SUMMARY OF THE INVENTION

In accordance with the principles of the invention, there is provided a mechanism for the rotary location of a workpiece in a machine tool, wherein the workpiece includes a flange having a hole in precise angular position. The machine tool includes a work drive spindle having an index plate secured thereto. A locating pin is secured to the index plate and has a locating surface for engagement with one side of the hole. The pin is provided with an axial slot in which is positioned a pivotally mounted pin driver. The driver includes an extending tongue having a surface for engagement with the opposite side of the hole. A spring urges the tongue against the surface of the hole as the locating pin is inserted into the hole to contact the hole at two opposite points. If there is any misalignment with the locating pin and the hole, the pin and the pin driver apply a turning force or moment to the workpiece to effect angular alignment.

In the preferred embodiment, the spring for resiliently urging the tongue against the surface of the hole is a tension spring connected between the pivotally mounted pin driver and a portion of the support for the locating pin.

It is, therefore, an object of the present invention to provide a novel locating mechanism for effecting precise rotary location of a workpiece, such as a crankshaft in an automatic crankpin grinding machine, when the crankshaft includes a flange having a locating hole.

A further object of this invention is the provision of a novel mechanism, wherein a biased pin driver forms a portion of the locating pin to urge and maintain a surface of the locating pin in firm engagement with the locating hole.

Another object is to provide means for adjusting the biasing force acting to retain a surface of the locating pin against the locating hole to prevent the crankshaft from being angularly disoriented.

The above and other features and advantages of the present invention will become better understood from the detailed description of the invention that follows when considered in connection with the accompanying drawings.

BRIEF DESCRIPTION OF THE DRAWINGS

FIG. 1 is a fragmentary side elevational view of a portion of an automatic crankpin grinding machine, embodying the principles of the instant invention;

FIG. 2 is a front view of the locating mechanism taken along the line 2—2 of FIG. 1, and illustrates the position of the locating pin which is effective to align a crankpin with the work drive spindle;

FIG. 3 is a sectional view taken generally along the line 3—3 of FIG. 2, illustrating the construction of the locating pin mechanism; and FIG. 4 is a plan view illustrating the shape of the locating pin and the position of the pin drive tongue in solid lines when the locating hole is engaged by the locating mechanism, and the tongue is partially shown in broken lines when in the disengaged position.

DETAILED DESCRIPTION OF THE INVENTION

A portion of an automatic crankpin grinding machine 10 is illustrated in FIG. 1 of the drawings, which includes a rotatable work drive spindle 11. The spindle 11 carries a conventional clamping fixture 12 to support a workpiece, such as a crankshaft W, which, in the illustrated embodiment of the invention, includes a flange 13 provided with a single locating hole or opening 14.

A rotary index plate 16 is positioned generally in axial alignment with the crankshaft W and in an eccentrically offset relation to the axis of rotation of the spindle 11 and the clamping fixture 12. The index plate 16 carries the novel locating mechanism of this invention, which is generally designated 17.

The locating mechanism 17 includes locating means in the form of a locating pin 18 which projects into the opening 14 of the flange 13 when the crankshaft W is axially positioned against a locating surface 19 by automatic means which are conventional. The locating pin 18 is formed from a support member 21 which includes a protruding portion 22 received by a pilot bore 23 in the index plate 16. The support member 21 is secured to the index plate 16 by screws 24—24 (FIGS. 2 and 3).

The locating pin 18 includes an axial slot 26 (FIG. 4) which receives a tongue 27 extending axially from a locating pin driver 28. The pin driver 28 is pivotably mounted to the member 21 through a pin 29 (FIGS. 2 and 3) and is biased in a radially outward direction from the locating pin 18 by a tension spring 31. The spring 31 is connected between the rearward end of the pin driver 28 and a fastener 32 secured to the support member 21. The tension on the spring 31 is adjusted by a pair of locking nuts 33 in a conventional manner.

The locating pin 18 includes chamfered surfaces 34—34 (FIG. 4) and beveled or relieved portions 36—36 on each side of a precise locating surface 37. The beveled portions 36—36 assure that the locating pin 18 and the cooperating tongue 27 engage the locating hole 14 on diametrically opposed surfaces of the hole 14. The tongue 27 engages one side of the hole 14 with a locating surface 30, and provides a biasing force to retain the solid locating surface 37 of the locating pin 18 against the left hand side (FIG. 4) of the hole 14.

It should be noted that the locating surface 30 of the tongue 27 extends, as shown by the broken line 30' (FIG. 4), when not positioned in the locating hole 14. The tongue 27 is retained in a predetermined radially outward position so that the overall dimension X is slightly larger than the hole 14 in the crankshaft W. However, the dimension X must not be so large as to prevent the locating pin 18 from entering the locating hole 14. This dimension is determined by machining a surface 38 of a stop plate 39 to abut the pin driver 28 and to limit the clockwise movement (FIG. 3) of the pin driver 28. The stop plate 39 is secured to the support member 21 by fasteners 41—41 (FIG. 2).

The crankshaft W is axially positioned when the locating hole 14 is in angular alignment with the locating pin 18. The tongue 27 is pivoted in a counter-clockwise direction (FIG. 3) by engagement of a chamfered surface 42 with the right hand side of the locating hole 14, and the tension on the spring 31 is increased. The locating pin 18 exerts a turning force or moment against the crankshaft W so as to turn the crankshaft W to a position at which the locating pin 18 and the tongue 27 are firmly in contact with the opposite sides of the locating hole 14.

This invention is particularly useful in the automatic grinding of a crankshaft, as covered in U.S. Pat. No. 3,118,258, granted Jan. 21, 1964, where it is necessary to angularily index a crankshaft through a precise angle with the index plate 16. The index plate 16 is rotated until the axis of the pin diameter to be ground is in correct alignment with the axis of the spindle 11.

It should be understood that the principles taught in this invention could be applied to a locating mechanism where the tension spring 31 is mounted externally of the support member 21. The tongue 27 of the pin driver 28 would still be resiliently mounted within the slot 26 of the locating pin 18, and the pin driver 28 would still effect a biasing force to retain the locating surface 37 against the left hand side of the locating hole 14.

The instant invention permits the use of a spring which is large enough to retain its resiliency, and which can be readily adjusted to increase or decrease the turning force applied to the crankshaft W by the tongue 27. It provides a simple and inexpensive apparatus for repeated angular positioning of crankshafts in a precise position.

It is to be understood that only a preferred embodiment of the invention has been specifically illustrated and described, and variations may be made thereto without departing from the invention, as defined in the appended claims.

I claim:

1. A mechanism for the rotary location of a workpiece in a machine tool, wherein the workpiece includes a flange having a hole in a precise angular position, and wherein the machine tool includes a work drive spindle which comprises:

an index plate secured to said spindle;
   a locating pin secured to said index plate having a locating surface for engagement with one side of said hole, said pin having an axial slot therein;
   a pin driver mounted for pivotal movement in said slot, said driver including an extending tongue having a surface for engagement with the opposite side of said hole; and
   means for resiliently urging said tongue against the wall of the hole as said locating pin is inserted into the hole so that the hole is contacted at two opposite points and a turning force is applied to the workpiece to insure that the locating pin and the hole are precisely aligned.

2. A mechansim as recited in claim 1, wherein said urging means is a tension spring connected between said locating pin and said pin driver.

3. A mechanism as recited in claim 1, wherein said locating pin and tongue engage the hole at diametrically opposite surfaces.

4. A mechanism for the rotary location of a crankshaft in a machine tool having a work drive spindle, by utilizing as a locating surface a recess in a flange of the crankshaft in a precise angular position, which comprises:

an index plate carried by the machine tool spindle;
   a locating mechanism secured to the index plate and including a locating pin having an axial slot formed along one side thereof and having a locating surface along the opposite side;
   a pin driver pivotably mounted on the locating mechanism in the axial slot and having a tongue for engagement with a surface of the recess opposite from the locating surface of the locating pin; and a tension spring connecting the pin driver to the locating mechanism to bias one side of the locating pin snugly against one side of the recess in the flange in response to engagement of the tongue with the opposite side of the recess.

5. A locating mechanism as recited in claim 4, which further includes:

a stop plate secured to one end of the locating mechanism having an inwardly projecting surface for limiting the pivotable movement of the pin driver to establish a maximum dimension between the locating surface of the locating pin and the tongue slightly greater than the width of said recess.

6. A locating mechanism as recited in claim 4, which further includes:

means for adjusting the biasing force of the tension spring without altering the overall dimension between the locating surface of the locating pin and the recess engaging portion of the tongue.

7. A mechanism for rotationally locating a workpiece in a machine tool having a rotatable spindle wherein the workpiece has a flange with an axially extending bore therein at a precise angular location comprising an index plate adapted to be secured to the spindle, a locating pin secured to said index plate and configured for insertion into the bore, said locating pin including a surface portion selectively configured for mating engagement with the interior wall of the bore, a pin driver including a surface portion selectively configured for mating engagement with the interior wall of the bore, means for pivotally mounting said pin driver on said index plate so that when said pin driver is rotated to a first position said locating pin surface portion and said pin driver surface portion define a cylinder selectively sized for slidable insertion into the bore and so that said pin driver can be rotated from a second position whereat the diameter of said cylinder is equal to or less than the diameter of the bore to a third position whereat the diameter of said cylinder is greater than the diameter of the bore, means for subjecting said pin driver to a force for urging the displacement of said pin driver surface portion from said second position towards said third position, means for preventing the rotation of said pin driver beyond said third position, said pin driver including a selectively configured camming surface for engaging with the rim of the bore as said locating pin is inserted thereinto whereby said pin driver will be displaced to said first position and said locating pin surface portion and said pin driver surface portion will be forcefully urged into substantially mating engagement with the bore thereby precisely locating the workpiece.

8. A mechanism according to claim 7 wherein said locating pin includes a diametral axially extending slot diametrically opposite said locating pin surface portion, and said pin driver includes a tongue portion selectively configured for rotational displacement within said slot, said tongue portion having said pin driver surface portion and said camming surface thereon.

9. A mechanism according to claim 7, further comprising means for varying the force exerted on said pin driver by said subjecting means.

* * * * *